Figure 3:
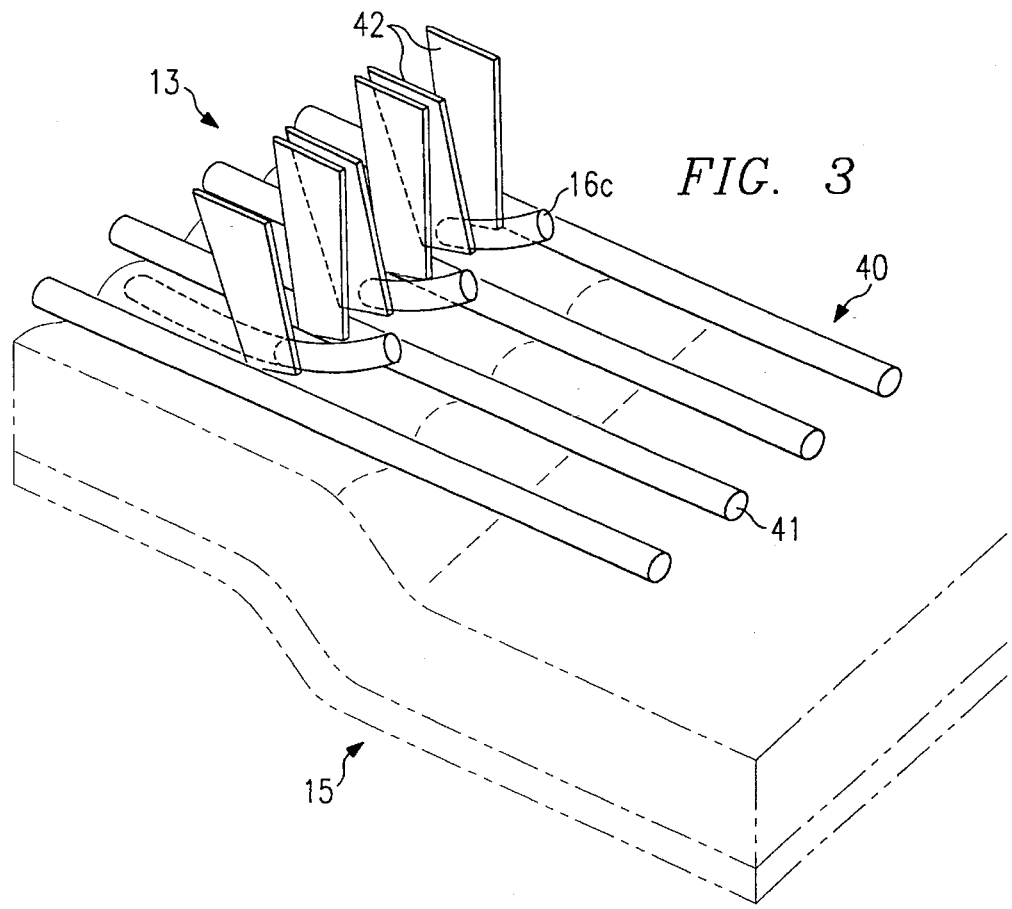

United States Patent [19]
Passchier

[11] Patent Number: 5,494,480
[45] Date of Patent: Feb. 27, 1996

[54] METHOD AND DEVICE FOR BONING ABDOMINAL SECTIONS, CONTAINING SPINAL PARTS, OF ANIMALS FOR SLAUGHTER

[76] Inventor: Bob Passchier, Birch Grove House, Cloonagh East, Tullamore, Co. Offaly, Ireland

[21] Appl. No.: 193,123

[22] PCT Filed: Aug. 11, 1992

[86] PCT No.: PCT/NL92/00143

§ 371 Date: Jun. 1, 1994

§ 102(e) Date: Jun. 1, 1994

[87] PCT Pub. No.: WO93/03621

PCT Pub. Date: Mar. 4, 1993

[30] Foreign Application Priority Data

Aug. 13, 1991 [NL] Netherlands ............... 9101384

[51] Int. Cl.⁶ .................................. A22C 17/04
[52] U.S. Cl. .................................. 452/171; 452/135
[58] Field of Search .................. 452/171, 135, 452/136, 138

[56] References Cited

U.S. PATENT DOCUMENTS 3,177,521  4/1965  Vogt et al. ............... 452/135
3,982,299  9/1976  Kompan .................. 452/171
4,134,181  1/1979  Schneider, Jr. .......... 452/171
5,023,975  6/1991  Van Der Hoorn et al. ... 452/135
5,197,918  3/1993  Klaassen ................. 452/135
5,211,600  5/1993  Passchier ................ 452/171

FOREIGN PATENT DOCUMENTS 0319090  6/1989  European Pat. Off. .
1312962  2/1989  Japan .
9103163  3/1991  WIPO .

*Primary Examiner*—Willis Little
*Attorney, Agent, or Firm*—Vinson & Elkins

[57] ABSTRACT

The invention relates to a method and a device for boning carcass portions of an animal for slaughter. Said carcass portions are in particular abdominal sections on part of the inner surface of which lies a row of more or less encapsulated ribs forming the bone parts which are to be removed. When the method is performed, each abdominal section is held in place and supported, each abdominal section being passed along a number of processing units. According to the invention, the ribs are weakened locally between the ends, and then bent over at a subsequent processing unit so that they break at the location of the weakened areas. By this method, it is possible to remove by machine at least one of the two rib parts formed in this manner.

10 Claims, 6 Drawing Sheets

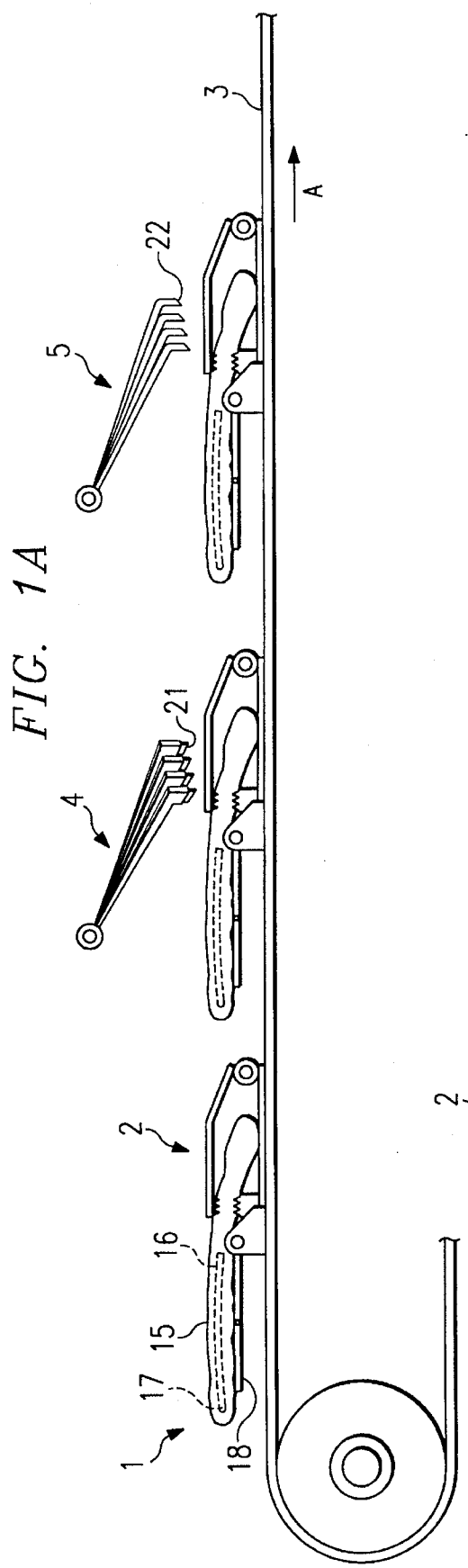
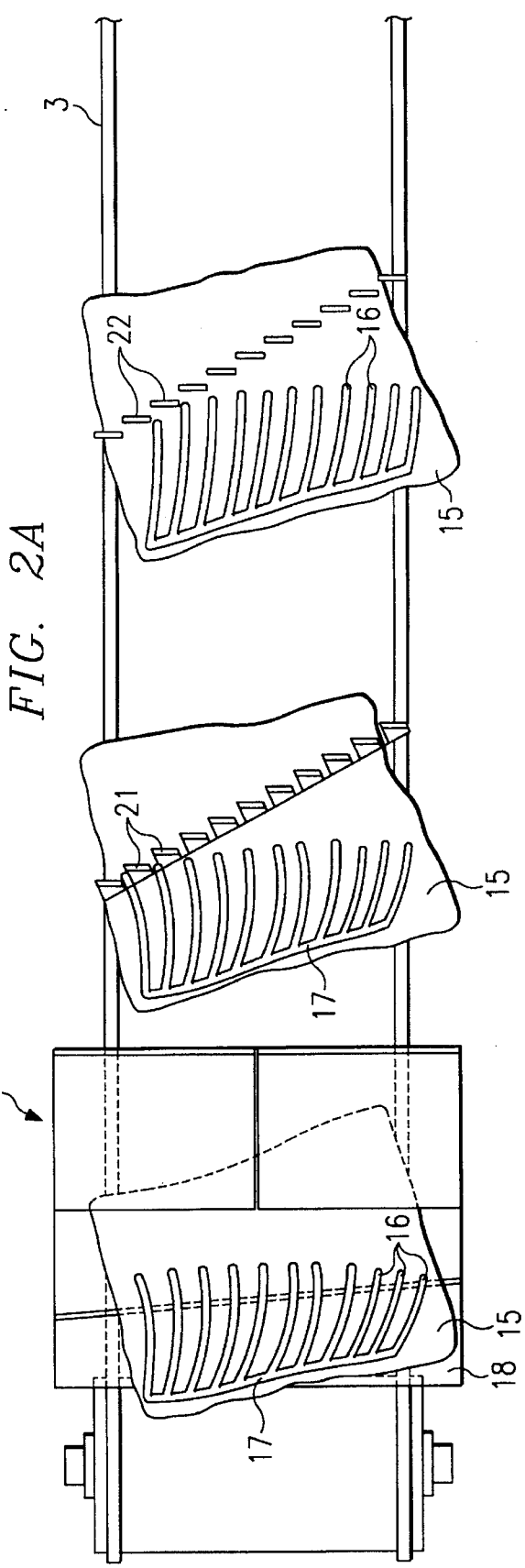

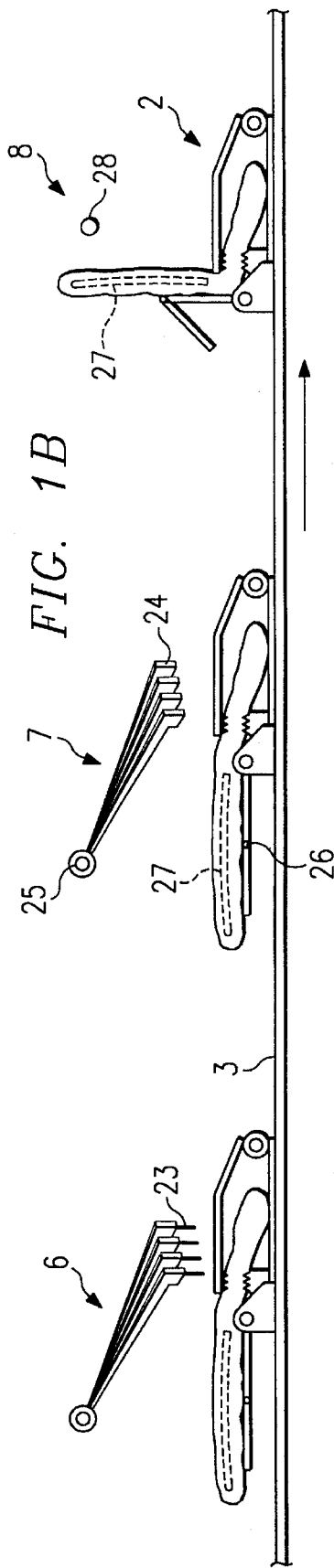
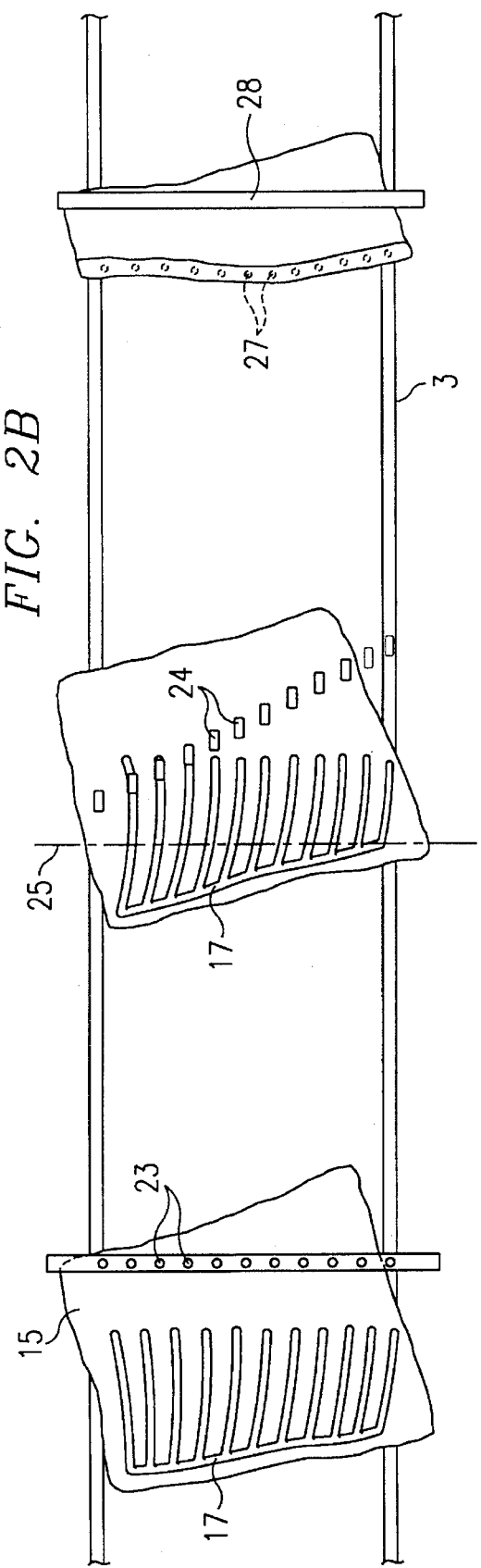

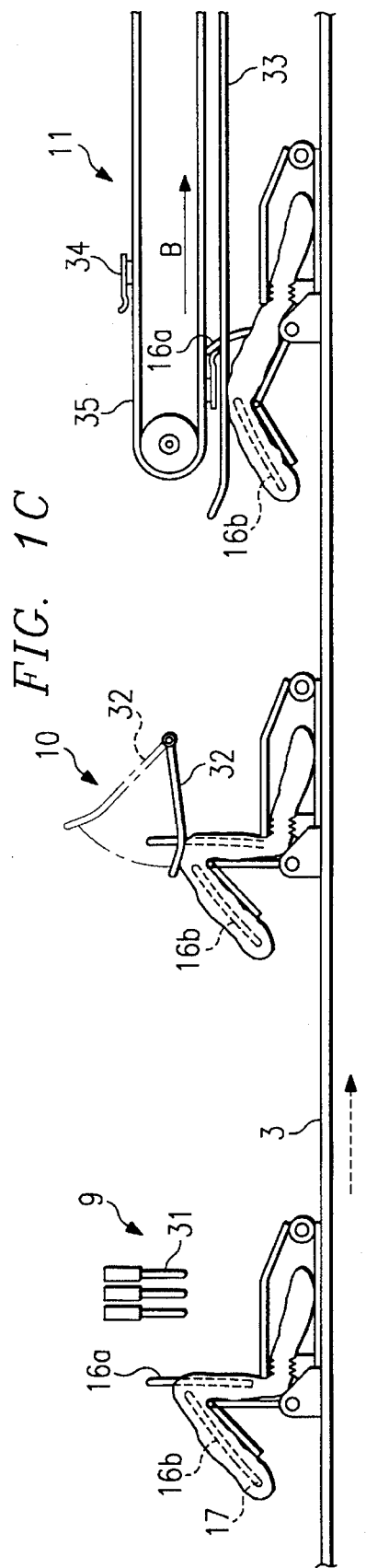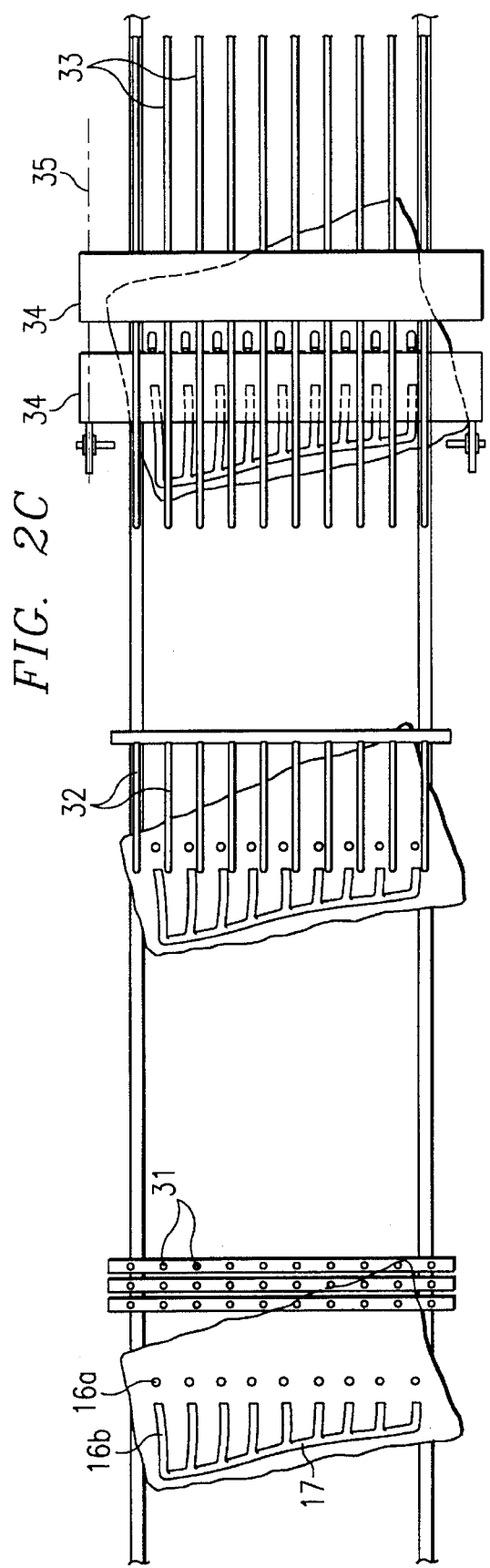

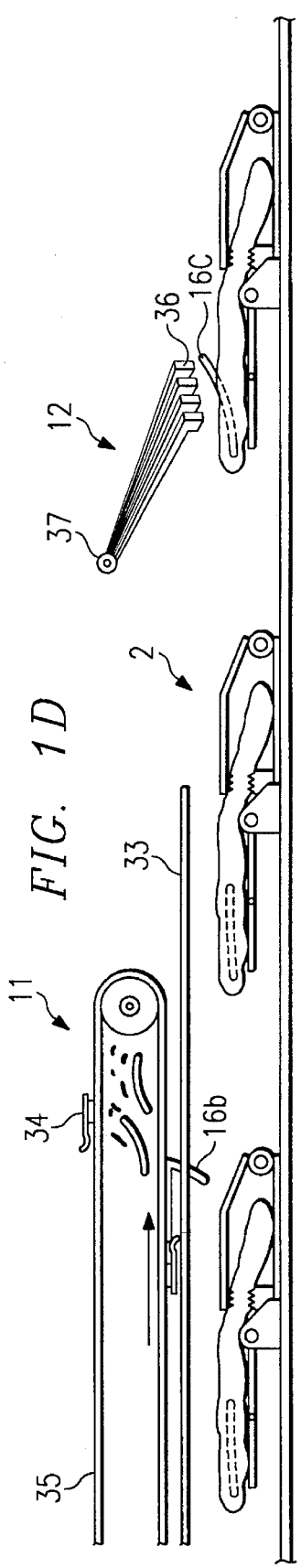
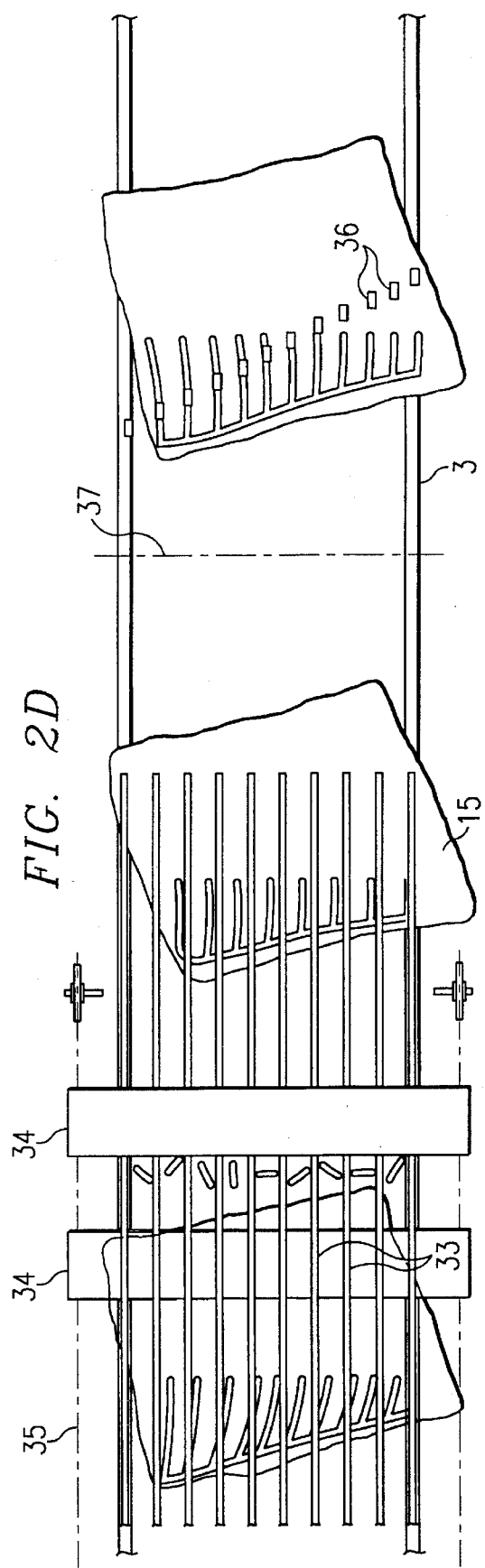

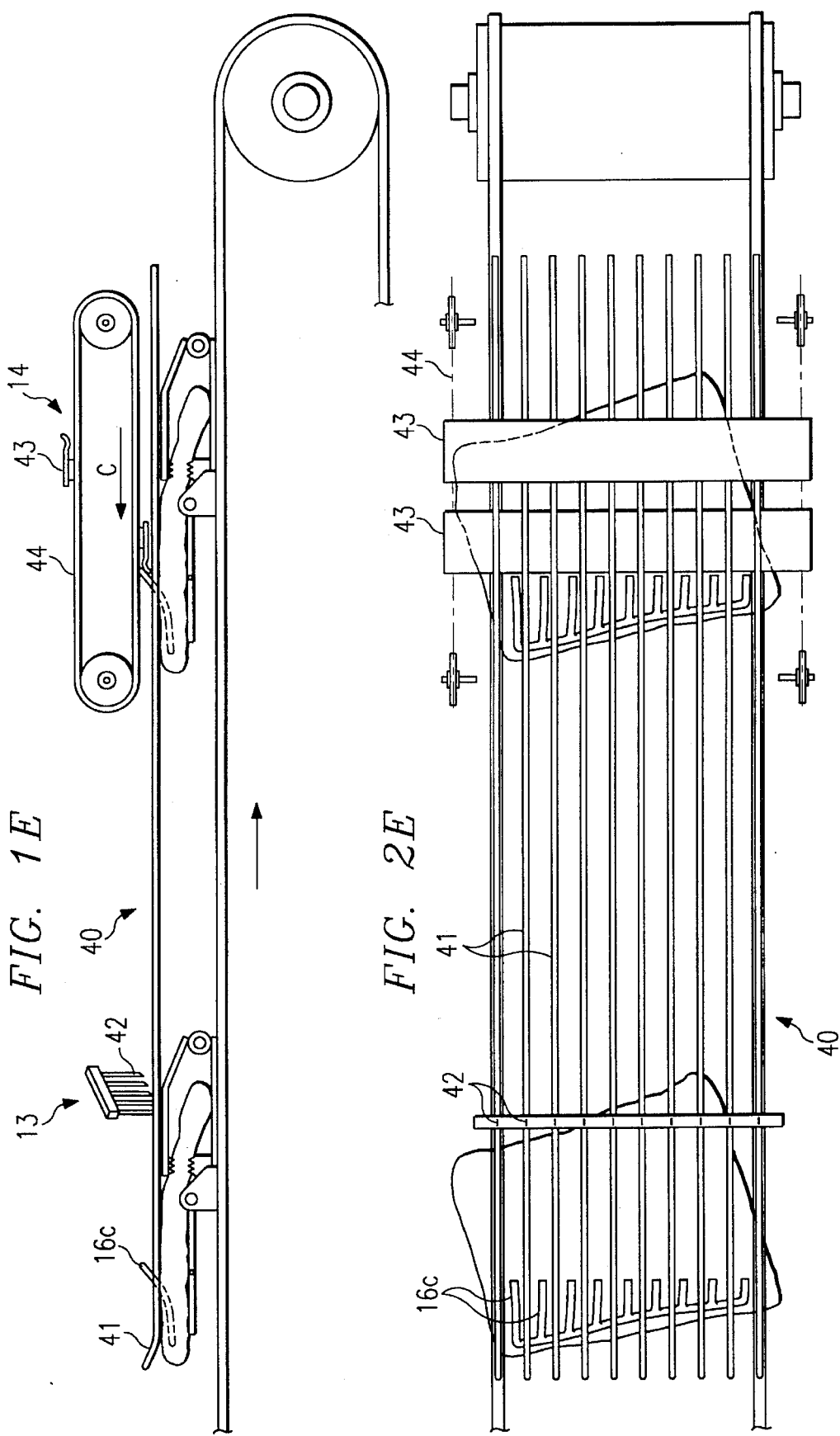

METHOD AND DEVICE FOR BONING ABDOMINAL SECTIONS, CONTAINING SPINAL PARTS, OF ANIMALS FOR SLAUGHTER

The present invention relates to a method for boning carcass portions of an animal for slaughter, in particular abdominal sections on part of the inner surface of which lies a row of more or less encapsulated ribs forming the bone parts which are to be removed and which extend essentially in parallel from a lateral edge of the abdominal section inwards, each abdominal section being held in place and supported and being passed along a number of processing units, as well as to a device for performing a method of this kind.

Such a method as well as the device to be used therefor are disclosed in, for example, international Patent Application WO91/03163. In said application, it is described how, according to a very advantageous method, the ribs can be removed from abdominal sections of an animal for slaughter. However, said method is suitable, in particular, for removal from abdominal sections in which the ribs have been cut off at a considerable distance from the spine of the animal for slaughter. The ribs contained in abdominal sections of this kind therefore have a relatively small length while the cut ends of said ribs are located at the lateral edge of the abdominal section. Therefore, and because said parts of the ribs were located at a considerable distance from the spine, these ribs are relatively easily removable from the abdominal section. According to said application, the portion of the abdominal section containing the ribs may, to this end, be bent over with respect to the ribless portion of the abdominal section after the ribs have been stripped of the membranes, whereby the ribs with their cut ends are made to protrude from the respective longitudinal edge of the abdominal section. By subsequently striking back the flesh from the protruding rib ends and then keeping the abdominal section pressed under a grate while the exposed rib ends protrude above the grate, these rib parts can relatively easily be struck out of the abdominal section, either entirely or in part, by means of an element moving above the grate.

However, there are also abdominal sections which are cut from the carcass of an animal for slaughter in such a way that the spine or at least remains of the spine are present in the abdominal section. Such abdominal sections are characterised in that the ribs present therein are in general relatively long and at the same time they are more firmly encapsulated by the flesh in the region of the spine compared with the aforementioned abdominal sections which may be boned by means of the method according to the said international patent application. Because of the length of said ribs as well as the nature of their attachment to the flesh, it has proved impossible to bone an abdominal section of this kind containing part of the spine or remains thereof according to a method and device as disclosed in said international Patent Application WO 91/03163. Until now such abdominal sections were therefore only boned by hand in accordance with a relatively costly and time-consuming procedure.

The object of the invention is to provide a method and a device for boning abdominal sections, with a part of the spine or remains thereof present therein, in an expedient, efficient and fast manner. For this purpose, the method of the kind mentioned in the preamble is characterised in that in at least one (first) processing unit a cutting or pressing force is exerted on each of the ribs at a location which is at a distance from the spine or remains of the spine, by means of which force each rib is weakened at the said location, after which the abdominal section is bent over at a subsequent (second) processing unit and each rib is broken at the said location so that the abdominal section is divided into two portions which are joined to one another, namely into a first portion in which are located the part or the remains of the spine and the rib parts extending therefrom as far as the locations of fracture, and a second portion in which the remaining parts of the ribs are located. Even if this method were carried out partly or entirely by hand, a marked improvement compared with the known method would be achieved. However, by developing the method according to the invention, it has become possible to entirely or almost entirely mechanise the boning of said abdominal sections, as a result of which personal and hygienic improvements have been achieved in addition to material improvements.

The ribs may, for example, be broken at the location of the weakened areas by supporting the abdominal section in such a manner that at least the part of the spine or the remains thereof are exposed, and exerting a striking force on said part or remains of the spine. Consequently, a bending force develops on the ribs which results in the ribs fracturing while at the same time the fractured rib ends come off the flesh because of the shock of the strike.

However, it is likewise possible to bend over the abdominal sections in a different manner after the ribs have been weakened locally, in order to break the ribs. In this case, it is preferable to exert a striking force on the part or remains of the spine after the abdominal sections are bent over and the ribs are thus broken, in the manner indicated above, so that at least the rib ends which are joined to the part or remains of the spine come off slightly from the flesh, thereby facilitating the subsequent machining step.

A device for carrying out the method according to the invention may, for example, be based on the device as disclosed in the abovementioned international Patent Application WO 91/03163. A device of this kind comprises a conveyor track having clamping means which are displaceable along said track for clamping carcass portions to be boned which are to be placed in the device, which clamping means are provided with a support element for at least partly supporting the outer side of the carcass portion, and a number of processing units disposed along the conveyor track. According to the invention, said device is characterised in that the support element is constructed in such a way that a lateral part of the carcass portion, preferably the lateral part containing at least the part or the remains of the spine, may be exposed, and in that at least one first processing unit is provided with means, such as hammer heads, for locally exerting a cutting or pressing force on the bones of the carcass portions, said hammer heads being connected with drive and control means in such a way that they can interact with the ribs between the ends thereof in order to at least weaken said ribs locally when a clamping means having a carcass portion clamped therein passes, and at least one second processing unit which is located downstream of the first processing unit is provided with one or more striking or pressing elements, such as hammer heads, which are displaceable with respect to a passing clamping means, which elements are connected to drive means and control means in such a way that they can interact, during the passage of a clamping means, with the said exposed lateral part of the carcass portion clamped in the clamping means and at a distance from the location where the processing means of the said first processing unit have interacted with the bones, as a result of which the ribs of said carcass portion are fractured at the locally weakened areas. Therefore, the device according to the invention comprises at least a first unit for locally weakening the ribs and a second processing unit downstream thereof for fracturing the ribs at the location of the weakened areas. At the same time, the fractured rib ends may already be released from the flesh in said second processing unit through the action of a striking force, but it is also possible to carry out this step in a subsequent processing unit. The abdominal section then initially only needs to be bent over after the ribs have been weakened locally. In this case, it is advantageous if the device comprises at least two of the said second processing units, one of which comprises a stop element which extends slightly above the conveyor track in a direction transverse to the longitudinal direction, which stop element is suitable to interact with the exposed lateral part of the carcass portion clamped in a passing clamping means. To this end, the carcass portion will have to be held in an upright position during passage of the said processing unit. This is explained clearly in the description of the figures. The stop element may consist of, for example, a fixed beam.

In order to facilitate the removal of the ribs even further, it is preferable to install a rack downstream of the said processing units, which rack consists of rods which are spaced apart and extend essentially parallel to the conveying direction of the track, pins or cutting elements protruding between and on either side of said rods. An abdominal section is held pressed between the rack and the conveyor track during passage, as a result of which the ribs between the rods of the rack are pressed upwards and are thus cut off to a greater extent from the flesh when passing the cutting elements or, in case pins are used, are pushed off the flesh.

In order to put the carcass portion into the various required positions during the mechanical operations, it is preferable to use a clamping means having a support element which comprises two hinging flaps, one of which is fastened by means of an edge to an edge of the other flap so that it can hinge.

Figure 4:
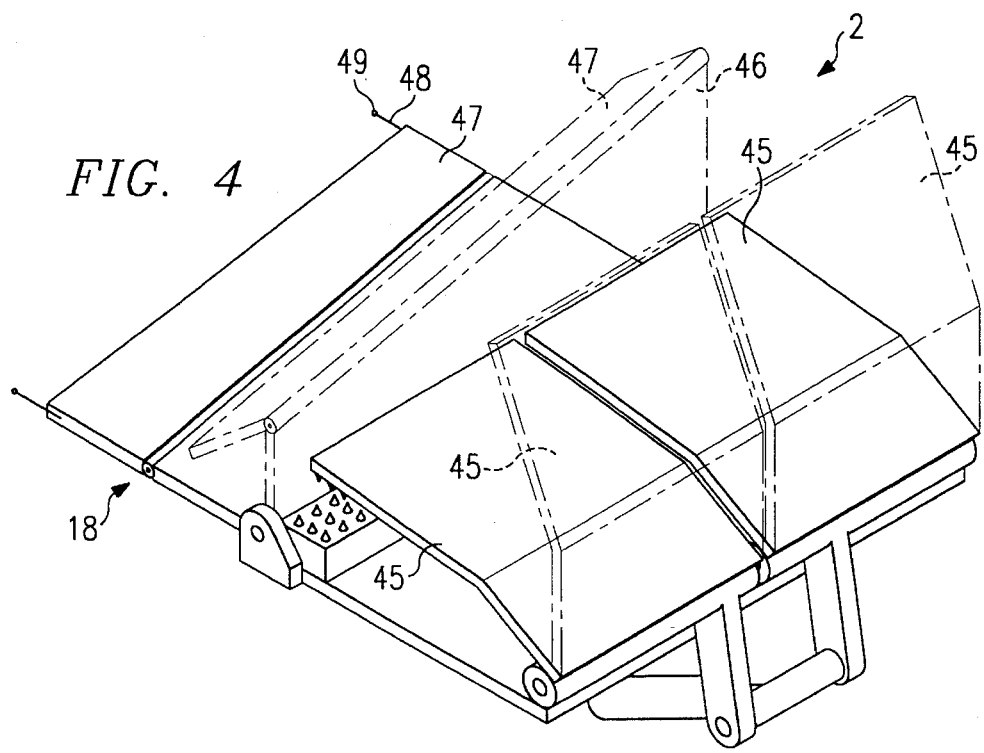

The invention will be explained below in more detail by reference to a non-limiting exemplary embodiment of the device according to the invention, in which:

FIGS. 1A–1E diagrammatically shows a side view of various processing units of an exemplary embodiment of the device according to the invention;

FIGS. 2A–2E diagrammatically shows a plane view of FIG. 1;

FIG. 3 diagrammatically shows a perspective view of a detail of a processing unit of the device illustrated in FIG. 1; and FIG. 4 diagrammatically shows a perspective view of the clamping means of FIG. 1.

FIGS. 1 (A–E) and 2 (A–E) show in a side and plane view, respectively, how clamping means 2 are passed along various processing units 4–14 in the direction of arrow A by means of a conveyor track 3 in a device 1 for boning abdominal sections. An abdominal section 15 is clamped in the clamping means 2, which will be described in more detail below, in such a way that the ribs 16 located therein extend essentially in conveying direction while the spine which still forms part of the abdominal section 15 is located outside the support 18 of the clamping means 2.

Moving from the beginning of the device i to the end, the clamping means 2 containing the abdominal section 15 clamped therein passes first three processing units 4, 5 and 6, respectively, which have already been disclosed in international Patent Application WO91/03163. Thus, for a detailed description of said processing units, reference is made to said publication. In these processing units 4, 5 and 6, respectively, the membranes and the flesh surrounding the ribs 16 is entirely or partly released and/or removed from these by means of knives 21, scrapers 22 and rubber fingers 23, respectively, so that the ribs 16 may be more easily removed from the abdominal section 15 at a later stage. Subsequently, the ribs 16 are weakened in processing unit 7 in a local area between the ends of said ribs. For this purpose, the processing unit 7 is provided with a number of hammers 24 which can be rotated about a pin 25 and which are mounted at such a mutual interspace that each of them interacts with one of the passing ribs 16 of an abdominal section 15. In this arrangement, each hammer 24 is driven separately. The ribs 16 are weakened in an area situated between the spine 17 of the abdominal section 15 and the hinge point 26 of the support 18 of the clamping means 2. The abdominal section 15 is bent over in the processing unit 8 downstream thereof so that the ribs 16 break in two at the location of the weakened areas 27. To this end, the support 18 is put in the upright position illustrated, as a result of which the part of the abdominal section 2 having the ribs 26 contained therein is brought upright. The abdominal section 2 then passes a fixed rod 28 which is located above the conveyor track 3 and which is positioned transversely to the conveying direction and interacts with the abdominal section 2 and the ribs 16 contained therein at a distance over the weakened area 27 of the ribs 17, which leads to the ribs 16 bending over and breaking.

In this manner, the ribs 16 are broken at processing unit 8 into rib parts 16a and 16b, respectively, rib part 16b being joined to the spine 17. The rib part 16a may subsequently be removed from the abdominal section in a manner already described in the international Patent Application W0 91/03163. To this end, the abdominal section 15 together with the rib parts 16a which have already been completely or partly stripped of membranes and released by means of processing units 4–6 are passed along processing units 9, 10 and 11, respectively. For a detailed description of said processing units 9, 10 and 11, respectively, reference is made to the abovementioned international patent application. Firstly, the rib parts 16a are further released from the flesh in the processing unit 9 by means of rubber fingers 31, then, in processing unit 10, the flesh between the rib parts 16a is struck by hammers 32 so that the rib parts 16a in the position as illustrated in FIG. 1 are made to protrude even further from the abdominal sections 15 and, subsequently, the abdominal sections 15 are passed under a grate 33 in processing unit 11, the exposed ends of the rib parts 16a protruding upwards through the grate 33, with removal elements 34 of a conveyor belt 35 situated above the grate 33 and moving in the direction of the arrow B hitting said ends, as a result of which the rib ends 16a are entirely or almost entirely removed from the abdominal section 15. A number of these removed rib parts 16a have been shown in the drawing. The rib parts 16a which are still present in the abdominal section 15 after passing the processing unit 11 can easily be removed by hand through a quick movement.

Finally, the rib parts 16b and the spine 17 joined thereto need to be removed. Firstly, a striking force has to be exerted at processing unit 12 on the part of abdominal section 15 protruding beyond the support 18. This may be the spine 17 or the adjoining part of the rib parts 16b. For this purpose, processing unit 12 is provided with hammers 36 which can hinge around hinge pin 37 and are each driven separately. Said hammers 36 are positioned at such a mutual distance that each of them may interact with a vertebra of the spine 17 or the adjoining end of a rib part 16b. As a result of the striking force exerted in processing unit 12, the end 16c of the rib part 16b comes off the abdominal section 15 and protrudes slightly above it. Because this end 16c is now released from the flesh, the further release of the rib parts 16b may now proceed in processing unit 13. To this end, the abdominal section 15 is passed under a grate 40 in processing unit 13, which grate is narrowly above the conveyor track 3. The bars 41 of said grate 40 run essentially in parallel with one another and in the conveying direction, the bars 41 leaving clearances between them such that the ends 16c of the rib parts 16b can protrude through them. Furthermore, the rib parts 16b are pressed slightly upwards between the bars 41 as a result of the relatively small distance of the grate 40 from the conveyor track 3. In this situation, the abdominal section 15 passes along a number of pins or knives 42 which are described in more detail below. By means of these pins or knives 42, the flesh is released or pushed from the abdominal section 15 even further. Subsequently, the rib parts 16b may be released from the Flesh yet further in processing unit 14. In this case, removal elements 43 moving narrowly above the grate 40 in the direction of the arrow C hit the ends 16c of the rib parts 16b. In this case, the removal elements 43 are driven by a drive belt 44. Especially in the case when the largest part of the spine has already been removed and, for example, remains thereof are still present in the abdominal section 15, most rib parts 16b will be removed by this method, while the rib parts 16b remaining in the flesh may be,removed later by means of a simple movement with the hand.

The action of the pins or knives 42 in the processing unit 13 will be explained in more detail with the aid of FIG. 3. As is shown, pins or knives 42 are mounted on either side of the bars 41 of the grate 40. In this case, the pins or knives 42 are spring-mounted in a direction transverse to the longitudinal direction of the bars 41. The ends of the pins or knives 42 protrude slightly From and under the grate 40. Thus, when an abdominal section 15 is passed along, the knives 42 will pass along a rib part 16b as a result of which this will be further released from the Flesh.

Finally, FIG. 4 shows a more detailed embodiment of the clamping means 2. The clamping part of said means having the hinging clamping jaws 45 which are denoted by solid lines in the operational position and by dash-dotted lines in an opened position corresponds with that of the clamping means of international Patent Application WO 91/03163. However, the support 18 for supporting the abdominal section part having the ribs 16 contained therein and the spine 17 is different. In order to achieve the various positions of this part of the abdominal section 15 shown in FIGS. 1 and 2, the support 18 comprises two supporting plates 46 and 47, respectively, which are connected to one another in a hinged manner on hinge 26 and the latter of which is provided with guiding rods 48 which follow a lateral guide by means of the free end 49. By means of a drive means (not shown) which acts upon plate 46 and the guide rods 48, the flat position represented by solid lines and the maximum upright position represented by dash-dotted lines and many intermediate positions (not shown) of the support 18 may be achieved, corresponding to the positions as shown in FIGS. 1 and 2.

The invention is of course not limited to the abovementioned exemplary embodiment. The order of the various processing units may, for example, be varied. It is also possible to omit a number of processing units, but this will lead to an increase in the amount of manual work required. In addition, a number of variations of the processing units described is also possible. However, the essence of the invention is that, for example, in the case of an abdominal section containing part or remains of the spine and ribs extending therefrom, said ribs are firstly weakened locally and then broken in those locations by bending over the abdominal sections. The local weakening may be effected by a striking force but of course also by a cutting force or the like and the bending over may be carried out by exerting a bending force, but also by exerting a striking force at a distance from the weakened areas. By means of said method, it is possible to substantially mechanise the boning of such abdominal sections. It is also possible to apply the invention to carcass portions which are similar to abdominal sections, as well as other carcass portions containing relatively elongated bones.

I claim:

1. A process for boning carcass parts of a slaughtered animal, in particular belly pieces on a part of the inner surface of which a row of more or less encapsulated ribs forming the pieces of bone to be removed is situated, the ribs extending inwards essentially parallel to each other from a side edge of the belly piece, each belly piece being held fast and supported and each belly piece being conveyed through a number of processing stations, after which the ribs are removed from the carcass parts, characterized in that the ribs are connected to a backbone part or backbone remains, and in that in at least one processing station a force is exerted on each of the ribs at a point at a distance from the backbone part or backbone remains, as a result of which each rib is weakened at the point in question, after which at a following processing station the belly piece is bent over and each rib is broken at the point mentioned, so that the belly piece is divided into two interconnected parts, a first part containing the backbone part or the backbone remains and the rib pieces extending therefrom to the break points, and a second part containing the other parts of the ribs.

2. The progress according to claim 1, wherein the bending over takes place by supporting the belly piece in such a way that at least the backbone part or the backbone remains are exposed, and exerting a striking force on said backbone part or said backbone remains.

3. The process according to claim 1, wherein in the second processing station after the bending over the belly piece is supported in such a way that at least the backbone part or the backbone remains are exposed and a striking force is exerted on said backbone part or said backbone remains.

4. A device for boning a carcass part of a slaughtered animal, the carcass part having a row of more or less encapsulated ribs on an inner surface thereof forming the pieces of bone to be removed, the ribs extending inwards essentially parallel to each other from a side edge of the carcass part, the device comprising a conveyor track with clamping means which can be moved along said track for clamping the carcass part, the clamping means having a supporting element for at least partially supporting the outside of the carcass part, and a number of processing stations disposed along the conveyor track, characterized in that the ribs are connected to a backbone part or backbone remains, and in that the supporting element is designed in such a way that a side part of the carcass part with at least the backbone part or the backbone remains is exposed, and in that at least one first processing station is provided with means for exerting a force locally on the bones of the carcass part, the exerting means connected to drive and control means in such a way that on the passing of the clamping means with the carcass part clamped therein, the exerting means can interact with the ribs at local points between the ends thereof in order at least to weaken said ribs locally, and in that at least one second processing station situated downstream of the at least one first processing station is provided with one or more pressure elements, which can be moved relative to the passing clamping means, and which are connected to drive means and control means in such a way that during the passage of the clamping means the pressure elements can interact with said exposed side part of the carcass part clamped in the clamping means and at a distance from the local points where the exerting means of said at least one first processing station have interacted with the ribs, as a result of which the ribs of said carcass part are broken at the locally weakened points.

5. The device according to claim 4, further comprising at least two of said second processing stations, one of which comprises a stop element extending directly above the conveyor track in a direction at right angles to the lengthwise direction thereof, and suitable for interacting with the exposed side part of the carcass part clamped in the passing clamping means.

6. The device according to claim 4, further comprising a rack of bars fitted downstream of the at least one first and second processing stations directly above the conveyor track, said bars running at a distance from each other essentially parallel to the direction of conveyance, and between which bars cutting elements project from the top on either side.

7. The device according to claim 4, wherein the supporting element of the clamping means comprises two hinged flaps, one of which is hingedly fixed by one edge to one edge of the other flap.

8. The device according to claim 5, further comprising a rack of bars fitted downstream of the at least one first processing station and the at least two of the second processing stations directly above the conveyor track, said bars running at a distance from each other essentially parallel to the direction of conveyance, and between which bars cutting elements project from the top on either side.

9. The device according to claim 5, wherein the supporting element of the clamping means comprises two hinged flaps, one of which is hingedly fixed by one edge to one edge of the other flap.

10. The device according to claim 4, 5, 6, 7, 8, or 9, further comprising a first plurality of processing stations having a series of cutting elements, a series of scraper elements, and a series of sprung finger-shaped elements disposed in succeeding order along the conveyor track upstream of the first and second processing stations, and a second plurality of processing stations having a series of pushing elements, a series of striking elements, and a rib ejector device disposed in succeeding order along the conveyor track downstream of the first and second processing stations, which are all connected to drive and control means in such a way that they can interact with the carcass part which is clamped in the clamping means passing the first and second plurality of processing stations.

* * * * *